G. W. WHITEMAN.
RAIL JOINT FOR U-RAIL SECTIONS.
APPLICATION FILED MAY 24, 1919.

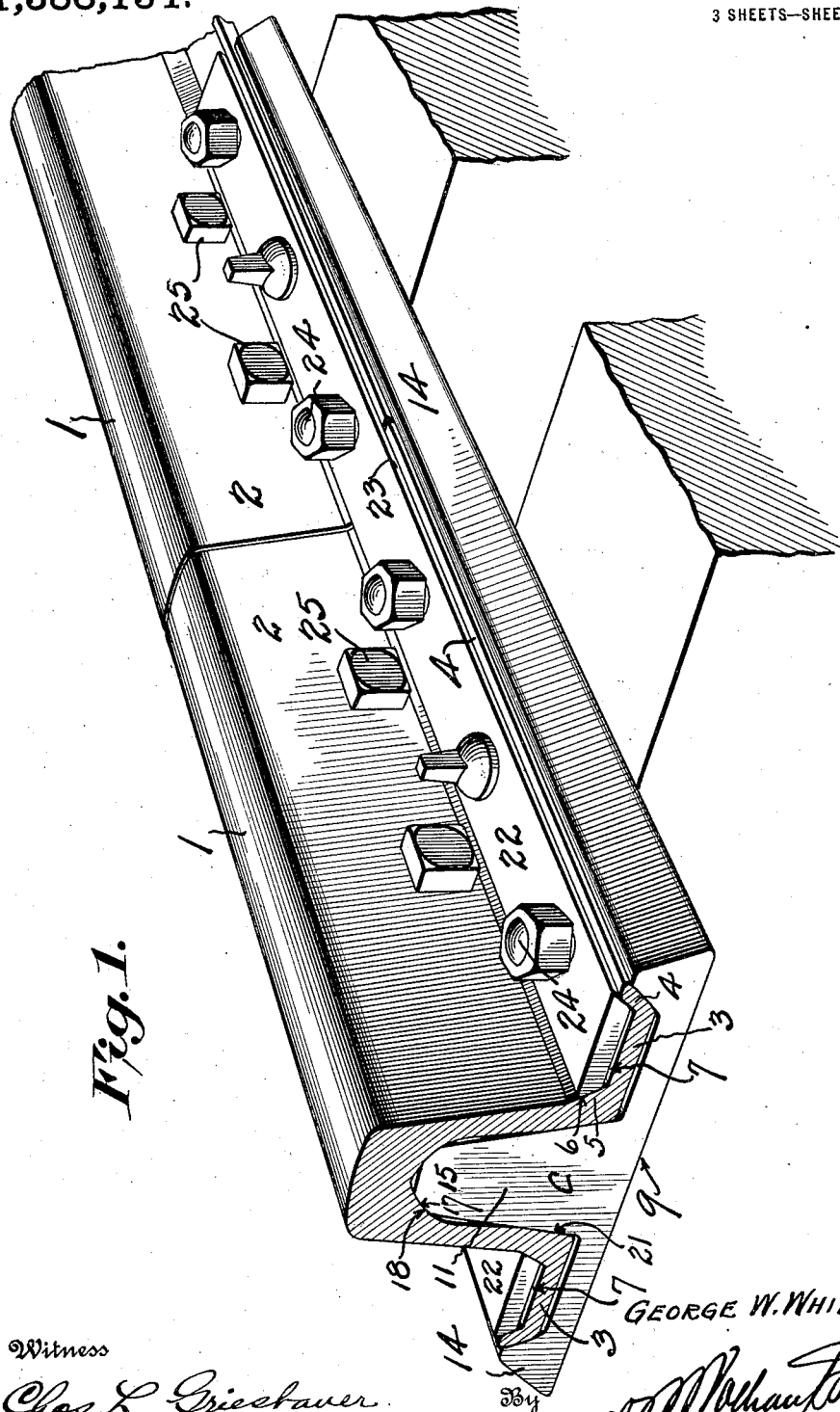

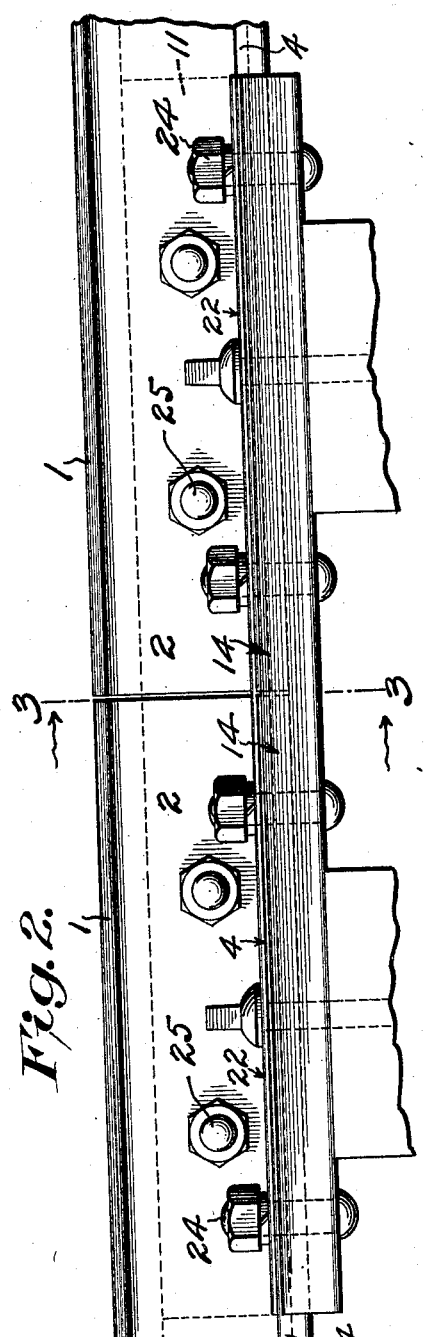
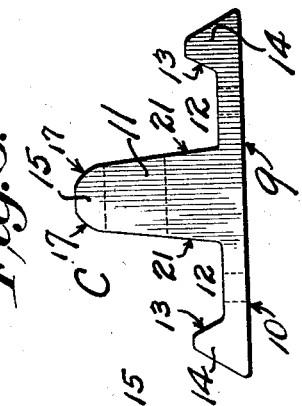
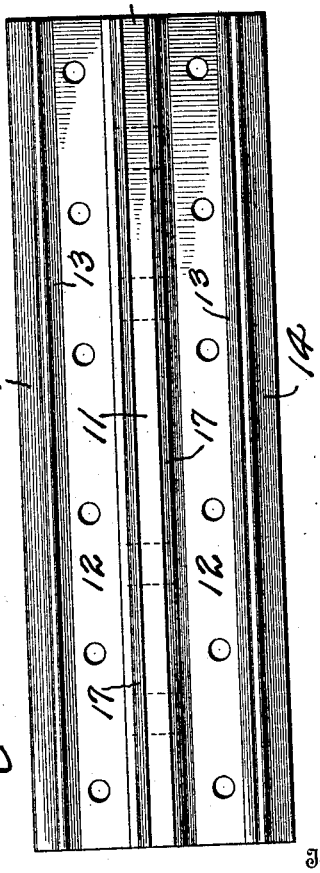

1,388,134.

Patented Aug. 16, 1921.
3 SHEETS—SHEET 3.

Inventor
GEORGE W. WHITEMAN,

Witness
Chas. L. Griesbauer

By
Attorney

UNITED STATES PATENT OFFICE.

GEORGE W. WHITEMAN, OF PHILADELPHIA, PENNSYLVANIA, ASSIGNOR TO THE RAIL JOINT COMPANY, OF NEW YORK, N. Y., A CORPORATION OF NEW YORK.

RAIL-JOINT FOR U-RAIL SECTIONS.

1,388,134.  Specification of Letters Patent.  Patented Aug. 16, 1921.

Application filed May 24, 1919. Serial No. 299,389.

*To all whom it may concern:*

Be it known that I, GEORGE W. WHITEMAN, a citizen of the United States, residing at Philadelphia, in the county of Philadelphia and State of Pennsylvania, have invented certain new and useful Improvements in Rail-Joints for U-Rail Sections, of which the following is a specification.

This invention relates to a novel and practical rail joint structure possessing special utility in its application as a splice for U-rail sections.

A difficulty heretofore experienced in adapting a U-rail section for general use in track has been to provide a safe and effective means for splicing the sections at the joints in such a manner as to enable them to withstand the acting and reacting forces of the road bed, the tie, the joint parts, the rail and the loaded wheels.

Accordingly the invention has for its chief object the provision of a rail joint for U-rails having the U-rail section so incorporated with the joint parts as to correlate the structural elements and to attain, in a practical and reliable way, the most efficient coöperation between the joint structure and the load forces imposed thereon.

Another object of practical importance is to provide as a part of the joint structure a U-rail section so designed as to be capable of being supported at the joint in the most effective manner, and also clamped in a correctly seated position upon its supporting base or chair to provide in effect a rigid continuous rail at the joint which is effectually stiffened and braced against the load forces passing therethrough at any angle.

A further object of the invention is to provide an improved joint structure for U-rail sections that will have the necessary features which adapt it to every present-day requirement, and in that connection it is proposed to so construct the various parts of the joint that ample take-up or adjustment is provided, for both wear and looseness.

Furthermore as a general object it is proposed to so design and combine the various parts of the joint structure that the same will be sufficiently strong and stiff to carry the heaviest loads, while at the same time being sufficiently flexible to accommodate itself to the wave motion of the track without breaking or buckling.

Other objects will be apparent to those familiar with the art of rail joints as the details of the improvement are pointed out in the description, claims and illustrations.

The particular features of the invention are necessarily susceptible of modification without departing from the scope of the invention, but a preferred and practical embodiment thereof is shown in the accompanying drawings, in which:—

Figure 1 is a perspective view of the rail joint for U-rail sections constructed in accordance with the present invention.

Fig. 2 is a side elevation thereof.

Fig. 4 is a top plan view of the splicing chair unit.

Fig. 5 is an end view of the splicing chair unit.

Like references designate corresponding parts in the several figures of the drawings.

Figure 3:
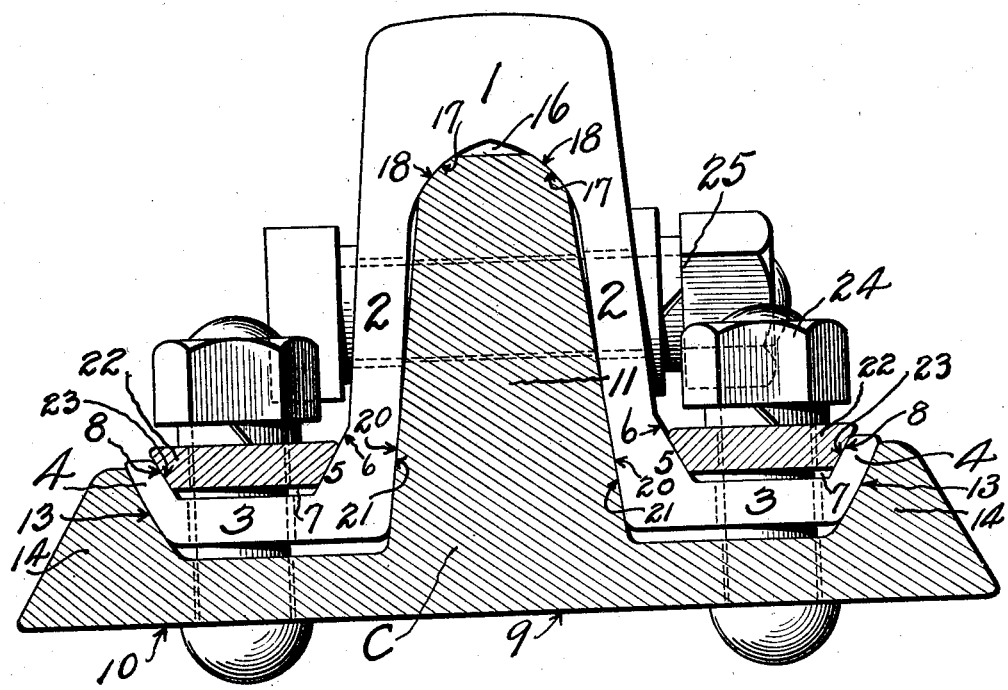
Fig. 3 is a vertical cross sectional view, at the center of the joint on the line 3—3 of Fig. 2.

A distinctive feature of the present invention is the embodiment in a rail joint of a U-rail section of special design whereby the particular objects of the invention may be effectually achieved. This U-rail section is intended to be rolled from a single billet or bloom according to a special plan of metal distribution set forth in another application filed by me this day, and the said section essentially comprises a solid head member 1, the opposite inclining side webs or legs 2—2, and a horizontal base flange 3 extending outwardly from the lower edge of each web or leg. The said head member is solidly and compactly rolled throughout and has the side edge portions thereof merged directly into the upper portions of the side webs 2 and substantially in alinement with the latter, thus providing a section wherein the head thereof is substantially braced at the sides by the inclining webs or legs. It will be observed that the bottom out-turned base flanges 3 combine with the side legs 2 to form relatively light angles which are therefore sufficiently flexible to render very effective the adjustable splicing and clamping means for the joint, while at the same time being sufficiently stiffened and reinforced to easily sustain any loads or strains imposed thereon. Certain important features are incorporated with the said base flanges 3, as a part thereof, to insure the proper performance of the functions referred to. These features are the provision of the flanges 3 at the outer edges with the upstanding inclined stiffening ribs 4 and the provision of the section at the outer inside corners, opposite the ribs 4, with the stiffening fillets 5 whose faces are beveled or inclined as at 6.

From the construction described it will be observed that in the process of producing the U-rail section, by a rolling operation, the outstanding feet of the section are channeled at their upper sides to form the horizontal fishing channels 7 confined between the ribs 4 and the fillets 5, and the inner faces of the ribs 4 are beveled or inclined as at 8 corresponding to the bevel or incline of the bearing faces 6 formed upon the fillets 5, as and for the purpose hereinafter more particularly referred to.

The splicing of two U-rail sections embodying the structural characteristics referred to is effected primarily by the use of what may be termed a splicing chair unit C which extends throughout the length of the joint. This splicing chair unit is plainly shown in Figs. 4 and 5 of the drawings and consists of a rolled section or bar embodying means for effectually supporting the U-rails both at the head of the rail and at the bases thereof. As illustrated, the splicing chair unit is formed with a tie bearing base portion 9 having a flat bottom or seat 10 for engaging with the supporting ties, and is formed with a central upstanding supporting core bar 11.

At its base, the said chair unit is provided at its upper side, and upon both sides of the upright core bar 11, with longitudinal rail-seating channels 12 confined between the inclining sides of the core bar 11 and the inclined or curved inner bearing faces 13 of the abutment shoulder projections 14 formed at the outer edges of the base portion 9 of the chair unit and projecting upwardly therefrom.

The crown or upper end portion 15 of the core bar 11 may be termed a saddle block— the U-rail being the saddle—and said saddle block has a clearance as at 16 from the central under part of the rail head 1, but is formed with the lateral inclined or curved rest faces 17 which are engaged by the opposite under bearing faces 18, at the under side of the rail head, and which are located respectively at opposite sides of the vertical central axis of the rail. Thus a two point bearing contact is provided between the head of the rail saddle and the saddle block or crown 15 of the chair unit and in addition to these points of contact the side legs 2 have an adjustable bearing engagement along their lower inner faces 20 with correspondingly inclined abutment faces 21 provided upon the side portions of the core bar 11 adjacent the base 9. Furthermore, the outer sides of the ribs or flanges 4 of the rail have a slidable bearing engagement with the inclined or curved inner bearing faces 13 at the inner sides of the abutment shoulder projections 14. Therefore, at each side of the central vertical axis of the rail the latter has a three point bearing contact with the splicing chair unit, said points of contact being respectively the bearings 18—19, the bearings 20—21 and the bearings 4—13, such a relation of bearing contacts providing for the most effective support and splicing of the U-rail section and also admitting of take-up and adjustments for wear and looseness.

Figure 6:
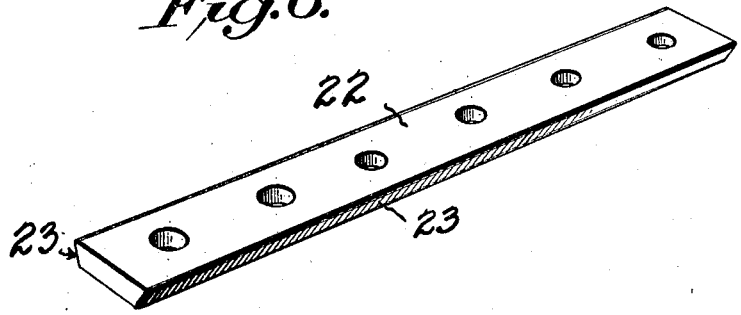
Fig. 6 is a detail perspective view of one of the clamping fish plates which is utilized for the vertical clamping of the U-rail section to its supporting chair.

It has already been pointed out that the said splicing chair unit is channeled over its base upon opposite sides of the core bar 11, to provide the seating channels 12 which receive the angled foot portions 2—3 of the U-rail sections. In conjunction with that structural feature the horizontal fishing channels 7 lying over the foot flanges 3 are adapted to adjustably receive therein the clamping fish plates 22 which may consist of plain flat rolled straps coextensive in length with the length of the joint. One of these clamping fish plates 22 is shown in Fig. 6 of the drawings and is preferably provided with flat upper and lower sides and with lateral inclined bearing edges 23 which respectively engage the inclined bearing faces 6 of the fillets 5 and the inclined bearing faces 8 of the reinforce ribs or flanges 4. These structural features provide, at each side of the joint, a horizontal clamping fish plate 22 in the form of a wedge in cross section which has an adjustable fit in the correspondingly shaped fishing channels 7 and is adjustably clamped in such channels by a series of vertical clamping bolts 24 passing through suitably alined bolt holes in the fish plates 22, the rail foot flange 3 and the base flanges of the splicing chair unit C as plainly shown in Fig. 3 of the drawings. When the vertical clamping bolts 24 are tightened the clamping fish plate at each side is drawn tightly between the inclined faces 6 and 8, downwardly into the fishing channel 7, with the result of carrying the ribbed or flanged foot flange 3 downwardly into the seating channel 12 of the splicing unit thus causing a tight wedging of the foot portion of the U-rail section not only downwardly upon the splicing chair unit, but also rigidly against the wall 21 of the core bar 11. To render the inward clamping fit of the U- rail section against the core bar more effective the bearing face 13 of the abutment or shoulder 14 may be slightly curved if found desirable or preferable, and in fact any of the inclining surfaces or faces herein referred to may be either on straight or curved lines without affecting or departing from the invention.

The fastening of the U-rail section and the splicing chair unit in permanent relation against relative longitudinal movement or displacement is effected by the use of a series of horizontal joint bolts 25 which extend horizontally through the alined bolt holes in the webs of the U-rail sections and in the core bar of the splicing chair unit.

It will have been observed that the arrangement of the bearing contacts 18—17 provides a substantial and rigid support for the head of the rail at its underside while at the same time not interfering with the downward adjustment of the rail to take-up wear should that become necessary, such adjustment being readily taken care of by the bolts 24 in connection with the vertical take-up clearance which is allowed for the foot flanges 3 and for the clamping fish plates 22.

From the foregoing it is thought that the construction and many advantages of the herein described rail structure for U-rail sections will be apparent without further description, and it will be understood that changes in the form, proportion and minor details of construction may be resorted to without departing from the spirit or sacrificing any of the advantages of the invention.

I claim:

1. A rail joint including a U-rail having a horizontal fishing channel and a fish plate fitting said channel.

2. A rail joint including a U-rail having a horizontal fishing channel and a fish plate adjustably fitting said channel.

3. A rail joint including a U-rail having a horizontal fishing channel, a fish plate adjustably fitting said channel and vertically arranged clamping devices for said fish plate.

4. A rail joint including a U-rail having a horizontal longitudinally extending fishing channel, a horizontal fish plate adjustably fitting said channel, and vertically arranged clamping bolts extending through the fish plate and the U-rail.

5. A rail joint including a U-rail having a channeled foot, a fish plate adjustably fitting the channeled foot, and means for exerting vertical clamping pressure on the fish plate.

6. A rail joint including a U-rail having outstanding feet each of which is channeled at its upper side to provide a fishing channel, and a fish plate adjustably clamped in each fishing channel.

7. A rail joint including a U-rail having outstanding feet each of which is formed at its upper side with a tapering channel, and a fish plate having a wedging engagement in each of said channels.

8. A rail joint including a U-rail having outstanding feet each of which is formed at its upper side with a tapering channel, and a fish plate having an adjustable wedging engagement in each of said channels.

9. A rail joint including a U-rail having outstanding foot portions each of which foot portions is of channel formation at its upper side with inclining bearing faces at the sides of the channel, and a fish plate of wedge form in cross section having an adjustable engagement with said inclining sides of the channel.

10. A rail joint including a U-rail section provided with a foot flange having an upstanding inclined reinforce rib at its edge, and an inclined fillet between the flange and a leg of the section, and a fish plate having an adjustable clamping engagement between said fillet and said rib.

11. A rail joint including a splicing chair unit, a U-rail having channeled foot portions adjustably engaging the chair unit, and fish plates clamped in the channels of the U-rail section.

12. A rail joint including a splicing chair unit having opposite channeled base flanges, a U-rail having channeled foot portions registering within the channels of said base flanges, and clamping fish plates registering in the channels of the foot portions of the U-rail.

13. A rail joint including a splicing chair unit having opposite channeled base flanges, a U-rail having channeled foot portions adjustably fitting the channels of said base flanges, and fish plates adjustably fitting the channels of said U-rail foot portions.

14. A rail joint including a splicing chair unit having opposite base flanges formed at their upper sides with tapering channels, a U-rail having foot portions adjustably fitting the channels of the chair unit and formed at their upper sides with tapering fishing channels, and fish plates adjustably fitting said fishing channels of the U-rail.

15. A rail joint including a splicing chair unit having an intermediate projection and outside abutment shoulders, a U-rail section having foot portions which respectively contact with the sides of said intermediate projection and with the said abutment shoulders and means engaging said foot portions causing the same to exert an inward clamping pressure against the intermediate projection.

16. A rail joint including a splicing chair unit having a core bar provided at the top with oppositely located bearing faces and adjacent the base with oppositely located abutment faces, and a U-rail saddled upon the core bar and having a bearing engagement with said several faces.

17. A rail joint including a splicing chair unit having a core bar provided at the top with oppositely located bearing faces and adjacent the base with oppositely located abutment faces, a U-rail saddled upon the core bar and engaging said several faces, and means for exerting an inward clamping pressure upon the lower portions of the U-rail.

18. A rail joint including a splicing chair unit provided at its lateral edges with abutment shoulders, with an intermediate core bar having at the top oppositely arranged bearing faces, and adjacent the base with oppositely arranged abutment faces, and a U-rail having contacting engagement with said bearing faces, the abutment faces and with said abutment shoulders.

19. A rail joint including a splicing chair unit, and a U-rail section having a three point contact with said unit at each side of the vertical central axis of the rail.

20. A rail joint including a splicing chair unit, and a U-rail section having a three point adjustable contact with said unit at each side of the vertical central axis of the rail.

21. A rail joint including a splicing chair unit having shoulder abutments at its lateral edges and provided with an intermediate core bar having at the top oppositely arranged bearing faces and adjacent the base oppositely located abutment faces, a U-rail saddled upon the core bar in engagement with the top bearing faces thereof and having channeled foot portions adjustably fitting between said abutment shoulders and said abutment faces, and clamping fish plates fitting the channels of the U-rail foot portions.

22. A rail joint including a splicing chair unit having a core bar provided with spaced top bearing faces upon its opposite sides and adjacent the base of the unit with abutment faces, a U-rail saddled upon the core bar in engagement with said faces, and horizontal fish plates adjustably engaging said foot flanges of the U-rail and exerting a downward and inward clamping pressure thereon.

23. A construction for rails consisting of an outer U-section having foot flanges, a chair member having a bearing contact with the inner lower portions of the webs of said U-section, and means independent of joint bolts for maintaining the said contact by clamping pressure.

In testimony whereof I hereunto affix my signature in the presence of two witnesses.

GEORGE W. WHITEMAN.

Witnesses:
MICHAEL A. MALONEY,
M. S. SMOKER.